(12) United States Patent
Chen et al.

(10) Patent No.: US 12,300,124 B2
(45) Date of Patent: May 13, 2025

(54) DISPLAY DEVICE

(71) Applicant: WUHAN CHINA STAR OPTOELECTRONICS TECHNOLOGY CO., LTD., Hubei (CN)

(72) Inventors: Yunni Chen, Hubei (CN); Fancheng Liu, Hubei (CN); Guowei Zha, Hubei (CN); Zhifu Li, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 297 days.

(21) Appl. No.: 17/925,033

(22) PCT Filed: Nov. 9, 2022

(86) PCT No.: PCT/CN2022/130764
§ 371 (c)(1),
(2) Date: Nov. 14, 2022

(87) PCT Pub. No.: WO2024/082356
PCT Pub. Date: Apr. 25, 2024

(65) Prior Publication Data
US 2024/0135843 A1  Apr. 25, 2024
US 2024/0233587 A9  Jul. 11, 2024

(30) Foreign Application Priority Data
Oct. 19, 2022  (CN) .......................... 202211277689.3

(51) Int. Cl.
*G09F 19/12*  (2006.01)
*G09F 13/30*  (2006.01)

(52) U.S. Cl.
CPC .............. *G09F 19/12* (2013.01); *G09F 13/30* (2013.01)

(58) Field of Classification Search
CPC .................................. G09F 19/12; G09F 13/30
See application file for complete search history.

(56) References Cited

U.S. PATENT DOCUMENTS 6,175,354 B1 *  1/2001  Blissett .................. G09G 3/005
                                                    345/110
6,265,984 B1 *  7/2001  Molinaroli ............ G09F 19/125
                                                    340/815.45
(Continued)

FOREIGN PATENT DOCUMENTS

CN          1873767 A     12/2006
CN          2909447 Y     6/2007
(Continued)

OTHER PUBLICATIONS

International Search Report in International application No. PCT/CN2022/130764, mailed on Jun. 25, 2023.
(Continued)

*Primary Examiner* — Gary C Hoge
(74) *Attorney, Agent, or Firm* — Rivka Friedman

(57) ABSTRACT

The present disclosure provides a display device. The display device includes a rotating light bar and a driving unit. The driving unit is connected to a center point of the rotating light bar, and the rotating light bar is configured to rotate with the center point of the rotating light bar as an axis. The rotating light bar includes light emitting device groups arranged along a width direction of the rotating light bar, each of the light emitting device groups includes light emitting devices arranged along a length direction of the rotating light bar, and the light emitting devices in two
(Continued)

adjacent ones of the light emitting device groups are staggered in the length direction of the rotating light bar.

20 Claims, 11 Drawing Sheets

(56)   References Cited

U.S. PATENT DOCUMENTS

| | | | |
|---|---|---|---|
| 2017/0124925 A1* | 5/2017 | Chykeyuk | B62J 6/20 |
| 2020/0378595 A1* | 12/2020 | Zhao | H01L 25/0655 |
| 2020/0387931 A1* | 12/2020 | Bastiyali | G09F 19/02 |
| 2021/0097906 A1* | 4/2021 | Chykeyuk | G09G 3/003 |
| 2021/0192996 A1* | 6/2021 | Onuki | G09F 19/12 |
| 2021/0344894 A1 | 11/2021 | Stokes | |
| 2022/0398954 A1* | 12/2022 | Kim | G09F 9/33 |
| 2024/0219746 A1* | 7/2024 | Chen | G02B 30/54 |

FOREIGN PATENT DOCUMENTS

| | | |
|---|---|---|
| CN | 102074170 A | 5/2011 |
| CN | 103680342 A | 3/2014 |
| CN | 106205405 A | 12/2016 |
| CN | 106847165 A | 6/2017 |
| CN | 109543506 A | 3/2019 |
| CN | 110189688 A | 8/2019 |
| CN | 110379336 A | 10/2019 |
| CN | 110675766 A | 1/2020 |
| CN | 111785180 A | 10/2020 |
| CN | 211826759 U | 10/2020 |
| CN | 212625570 U | 2/2021 |
| CN | 213240752 U | 5/2021 |
| WO | 2019078908 A1 | 4/2019 |
| WO | 2021139204 A1 | 7/2021 |
| WO | 2021215562 A1 | 10/2021 |

OTHER PUBLICATIONS

Written Opinion of the International Search Authority in International application No. PCT/CN2022/130764, mailed on Jun. 25, 2023.

Chinese Office Action issued in corresponding Chinese Patent Application No. 202211277689.3 dated Jan. 21, 2025, pp. 1-6.

* cited by examiner

DISPLAY DEVICE

FIELD OF INVENTION

The present disclosure relates to the field of display devices, and particularly to a display device.

BACKGROUND OF INVENTION

Persistence of vision phenomenon (POV) is also known as "afterglow effect". When human eyes observe a scene, it takes a short time from a light signal to the nerves in the brain, and a visual image does not immediately disappear after light effect. This phenomenon is called "persistence of vision". POV scanning display devices realize image displays by using visual persistence effect of human eyes and through horizontally moving or rotating LED light bars. Among them, the technology of using the visual persistence effect of the human eyes and through rotating the LED light bars to realize an image display is also called rotary display technology.

Traditional rotary display technology generally uses single or multiple light bars, which rotate with centers as axis, and each of LED light bars is provided with one or more rows of LED light beads along its extension direction. Among them, a pixel number in a single row of the LED light beads is less, and resolution improvement is limited. For multi-rows of LED light beads, distances between corresponding LED light beads on adjacent rows and the axis are different. It results in different rotation radiuses, which leads to problems such as uneven distribution of pixels or crosstalk caused by pixels overlapping during rotating.

Technical Problems

The present disclosure provides a display device to relieve technology problem of the rotary display technology in prior art that distance between corresponding LED light beads on adjacent rows and the axis are different to result in different rotation radiuses and lead to problems such as uneven distribution of pixels or pixel coincidence during rotation.

Technical Solutions

The present disclosure provides a display device, including:
   a light bar; and
   a driving unit connected to the light bar;
   wherein the light bar includes a plurality of light emitting device groups arranged along a width direction of the light bar, each of the light emitting device groups includes a plurality of light emitting devices arranged along a length direction of the light bar, and the plurality of light emitting devices in any two adjacent ones of the light emitting device groups are interleaved in the length direction of the light bar.

The present disclosure further provides a display device, including:
   a light bar; and
   a driving unit connected to the light bar;
   wherein the light bar includes a plurality of light emitting device groups arranged along a width direction of the light bar, each of the light emitting device groups includes a plurality of light emitting devices arranged along a length direction of the light bar, the plurality of light emitting devices in any two adjacent ones of the light emitting device groups are interleaved in the length direction of the light bar, and the plurality of light emitting devices located on a same one of the light bar are centrosymmetric with respect to a center point of the light bar.

Beneficial Effects

In the present disclosure, the light bar is provided to include a plurality of light emitting device groups arranged along the width direction, and each of the light emitting device groups includes a plurality of light emitting devices arranged along the length direction of the light bar. Thus a quantity of the light emitting devices on the light bar is greatly improved, so as to improve a pixel number in the rotary display, and then effectively improve the resolution, to achieve an ultra-high resolution or even a continuous resolution display effect. Furthermore, in the present disclosure, the plurality of light emitting devices in any two adjacent ones of the light emitting device groups are staggered in the length direction of the light bar. The plurality of light emitting devices in the plurality of light emitting device groups can complement each other in rotation planes in rotary display and be uniformly distributed within the rotation radiuses of the light bar, so as to relieve phenomenon of pixel vacancy or pixel coincidence, and effectively relieve the display uniformity and crosstalk problems.

DETAILED DESCRIPTION OF EMBODIMENTS

In order to make purposes, technical solutions, and beneficial effects of the present disclosure clearer, following describes specific implementations of the present disclosure in detail with reference to accompanying drawings. It should be understood that the specific embodiments described herein are intended only to explain and not to limit the application.

Persistence of vision phenomenon (POV) is also known as "afterglow effect". When human eyes observe a scene, it takes a short time from a light signal to the nerves in the brain, and a visual image does not immediately disappear after light effect. This phenomenon is called "persistence of vision". POV scanning display devices realize image displays by using visual persistence effect of human eyes and through horizontally moving or rotating LED light bars. Among them, the technology of using the visual persistence effect of the human eyes and through rotating the LED light bars to realize an image display is also called rotary display technology.

Figure 1:
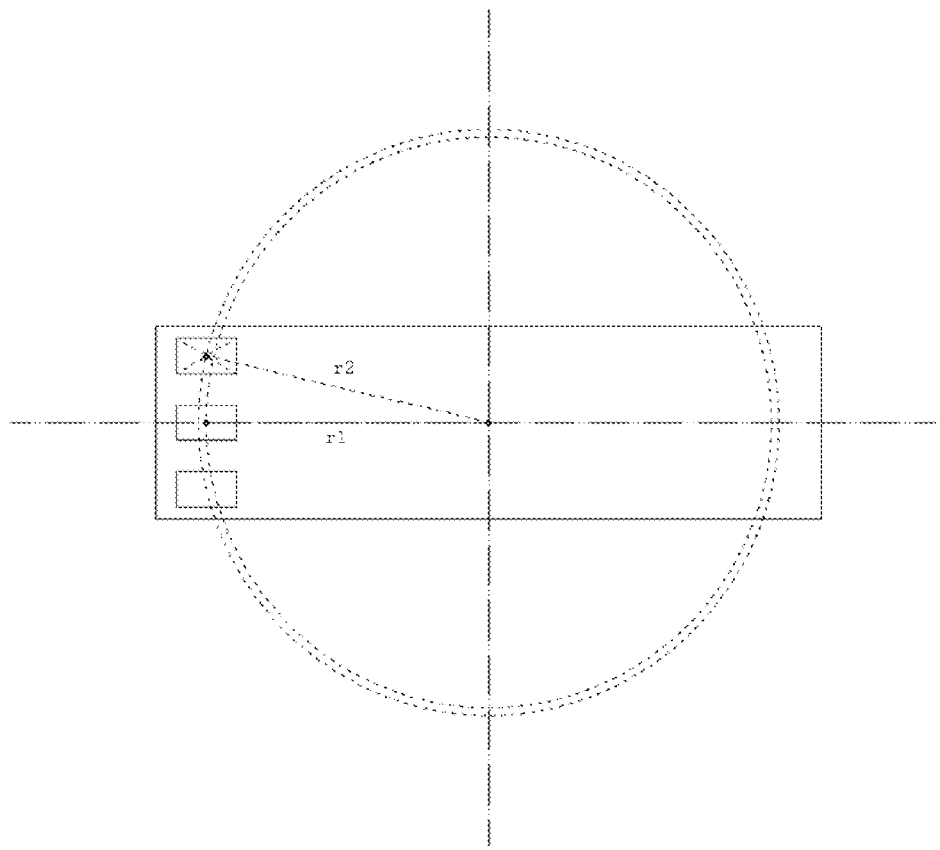
FIG. 1 is a schematic view of an arrangement of LED light beads on an LED light bar in traditional display technologies.

Traditional rotary display technology generally uses single or multiple light bars, which rotate with centers as axis. Each LED light bars is provided with one or more rows of LED light beads along its extension direction. Among them, a pixel number in a single row of the LED light beads is less, and resolution improvement is limited. Multi-rows of the LED light beads are generally arranged in a matrix way on the LED light bar. In a width direction of the light bar, distances between corresponding LED light beads on adjacent rows and the axis are different, as shown in FIG. 1. It results in different rotation radiuses (that is, r1<r2), which leads to problems such as uneven distribution of pixels or crosstalk caused by pixels overlapping during rotation. Following solutions are proposed in the present disclosure for technical problems mentioned above.

Referring to FIG. 2 to FIG. 11, the present disclosure provides a display device including a light bar 100 and a driving unit 200. The driving unit 200 is connected to the light bar 100. The light bar 100 includes a plurality of light emitting device groups 120 arranged along a width direction of the light bar 100. Each of the light emitting device groups 120 includes a plurality of light emitting devices arranged along a length direction of the light bar 100. And the plurality of light emitting devices in any two adjacent ones of the light emitting device groups 120 are staggered in the length direction of the light bar 100.

In the present disclosure, the light bar 100 is provided to include the plurality of light emitting device groups 120 arranged along the width direction, and each of the light emitting device groups 120 includes the plurality of light emitting devices arranged along the length direction of the light bar 100. Thus a number of the light emitting devices on the light bar 100 is greatly improved, so as to improve a pixel number in the rotary display, and then effectively improve the resolution, to achieve an ultra-high resolution or even a continuous resolution display effect. Furthermore, in the present disclosure, the plurality of light emitting devices in any two adjacent ones of the light emitting device groups 120 are staggered in the length direction of the light bar 100. The plurality of light emitting devices in the plurality of light emitting device groups 120 can complement each other in rotation planes in rotary display and be uniformly distributed within the rotation radiuses of the light bar 100, so as to relieve the phenomenon of pixel vacancy or pixel coincidence, and effectively relieve the display uniformity and crosstalk problems.

The technical solutions of the present disclosure are described in combination with specific embodiments. It should be noted that an order of description of following embodiments shall not be considered as a restriction on a preferred order of embodiments.

In an embodiment, the light bar 100 may further include a base substrate 110, and the plurality of light emitting devices are disposed on the base substrate 110. A shape of the base substrate 110 may be a rectangle. The base substrate 110 may be an array substrate, and the array substrate may be provided with a driving circuit configured to drive the light emitting devices to emit light.

In an embodiment, the light emitting devices may be OLED light emitting devices, LED chips, Mini-LED chips, Micro-LED chips, and so on.

In an embodiment, the driving unit 200 may include a rotating shaft 220 and a driving member 210 configured for driving the rotating shaft 220 to rotate. A center point of the light bar 100 is fixedly connected to an output end of the rotating shaft 220, so that the light bar 100 can be driven by the driving member 210 through the rotating shaft 220 to rotate with its center point as an axis, so as to realize the rotary display.

In an embodiment, a rotate speed of the rotating shaft 220 may be greater than or equal to 720 r/min, so that when the light bar 100 is in the rotary display, a previous frame can be connected to a next frame without interruption, and consistency of a display image is better.

Figure 2:
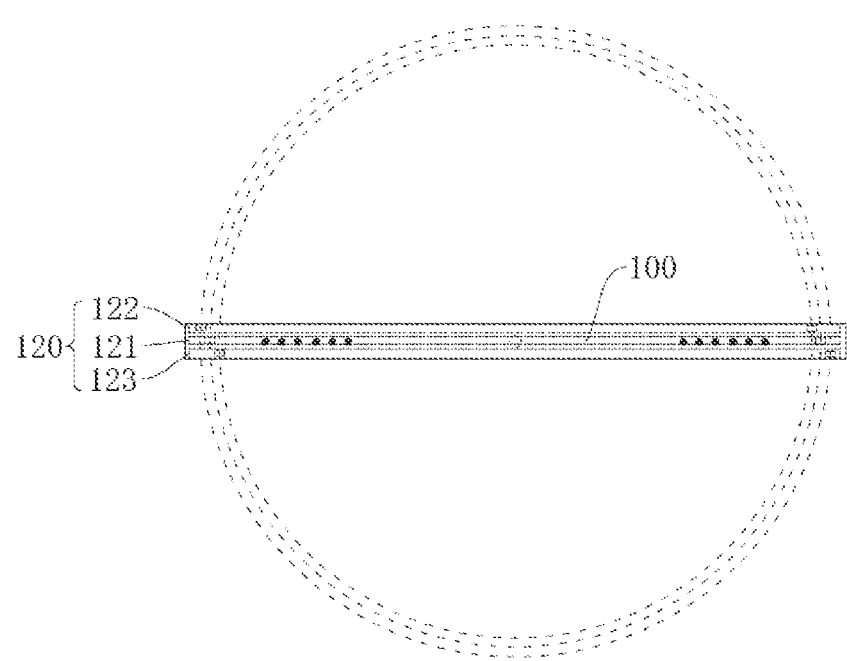
FIG. 2 is a first schematic plane structural view of a display device in the present disclosure.

Referring to FIG. 2, in the embodiment, one light emitting device group 120 may be a row of light emitting devices along the length direction of the light bar 100. That the plurality of light emitting devices in any two adjacent ones of the light emitting device groups 120 are staggered in the length direction of the light bar 100 may be: orthographic projections of multiple light emitting devices in two adjacent light device groups 120 on a center axis of the light bar 100 along the length direction not overlapping, so as to avoid or relieve the phenomenon of pixel coincidence and crosstalk in the display image when the light bar 100 rotates.

In each of the light emitting device groups 120, distances between any two adjacent ones of the light emitting devices along the length direction of the light bar 100 may be different, so that in the plurality of the light emitting device groups 120, distances between the center point of the light bar 100 and multiple light emitting devices staggered along the length direction of the light bar 100 form an arithmetic sequence during rotating, thereby multiple light emitting devices forming a plurality of pixels evenly distributed in a circular display plane.

In an embodiment, two adjacent ones of the light emitting device groups 120 may be two adjacent rows of light emitting devices arranged along the width direction of light bar 100, and distances between any two adjacent rows of the light emitting devices in the width direction of light bar 100 may be equal.

In an embodiment, each of the light emitting devices may be a monochromatic light emitting unit or a monochromatic pixel unit, for example, the light emitting device is one selected from a red subpixel, a green subpixel, and a blue subpixel. Alternatively, each of the light emitting devices may be a multi-color light emitting unit or a multi-color pixel unit, for example, each of the light emitting devices may include a red subpixel, a green subpixel, and a blue subpixel.

Figure 3:
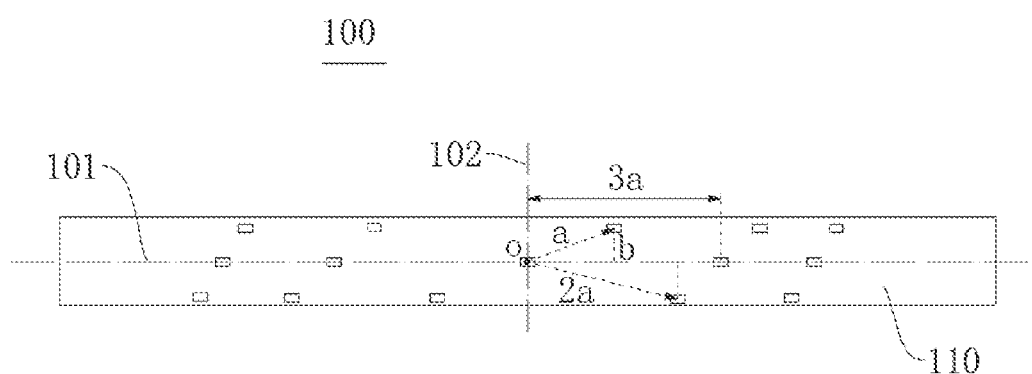
FIG. 3 is a schematic view of a partial arrangement of light emitting devices on a light bar of the present disclosure.

Referring to FIG. 3, in the display device of the present disclosure, the light bar 100 may include a first axis line 101 extending along the length direction and a second axis line 102 extending along the width direction. The first axis line 101 intersects the second axis line 102 vertically, and an intersection point of the first axis line 101 and the second axis line 102 is defined as a center origin O, that is, the center point of the light bar 100.

In an embodiment, the plurality of light emitting devices located on a same light bar 100 are centrosymmetric with respect to the center point of the light bar 100. In detail, the first axis line 101 and the second axis line 102 divide the light bar 100 into four areas with equal area sizes, and the light emitting devices in two of the areas at diagonal positions are symmetrical with respect to the intersection point of the first axis line 101 and the second axis line 102. That the plurality of light emitting devices disposed symmetrically with respect to the center point of the light bar 100 makes an arrangement of the light emitting devices on the light bar 100 have symmetry, thereby achieving good uniform display when the light bar 100 is rotated.

Referring to FIG. 2 and FIG. 3, in the display device of the present disclosure, the light emitting device groups 120 include a first light emitting device group 121 disposed on the first axis line 101, a second light emitting device group 122 disposed on a side of the first light emitting device group 121, and a third light emitting device group 123 disposed on a side of the first light emitting device group 121 away from the second light emitting device group 122. In the width direction of the light bar 100, a distance between the first light emitting device group 121 and the second light emitting device group 122 is equal to a distance between the first light emitting device group 121 and the third light emitting device group 123, so that the first light emitting device group 121, the second light emitting device group 122, and the third light emitting device group 123 are arranged at equal intervals on the light bar 100 to improve uniformity of pixel distribution.

In the embodiment, on a side of the second axis line 102, a distance between an nth one, from the center origin O and along the length direction of the light bar 100, of the light emitting devices and the center origin O is n*a, "n" is zero or a positive integer, and "a" is a distance between the one of the light emitting devices closest to the center origin O and the center origin O. Referring to FIG. 3, in the embodiment, in order to show a distribution of the light emitting devices on the light bar 100 more clearly and intuitively, the first axis line 101 and the second axis line 102 may define a plane rectangular coordinate system, the first axis line 101 may be a horizontal coordinate axis, and the second axis line 102 may be a vertical coordinate axis. According to the rectangular coordinate system, each of the light emitting devices on the light bar 100 may correspondingly have a unique and definite positioning coordinate.

In detail, the center origin O (that is, the intersection point of the first axis line 101 and the second axis line 102) of the plane rectangular coordinate system is defined as a starting zero point. On a side of the vertical coordinate axis, a coordinate of an nth one of the light emitting devices, from the starting zero point and along the length direction of the light bar 100, satisfies: $(\sqrt{(n*a)^2-b^2}, (-1)^{n+1}n*b)$, $(-\sqrt{(n*a)^2-b^2}, (-1)^{n+1}n*b)$, $(n*a, 0)$, or $(-n*a, 0)$, where "n" is a positive integer, "a" is a distance between the one of the light emitting devices closest to the center origin O and the center origin O, and "b" is a distance between the first light emitting device group 121 and the second light emitting device group 122 or the third light emitting device group 123 along the width direction of the light bar 100.

In an embodiment, the "n" in the nth one of the light emitting devices may be a sequence number in least to most order of a distance between the light-emitting device on a portion of the light bar 100 located on a side of the second axis line 102 and a starting point, wherein the center origin O is defined as the starting point. It can be understood that, in the embodiment, the light emitting devices on both sides of the first axis line 101 are equally spaced from the first axis line 101 with a distance of "b". In the embodiment, since the plurality of light emitting devices on the light bar 100 are centrosymmetric with respect to the center point of light bar 100, the coordinate values of symmetric light emitting devices have a same magnitude but opposite signs. For example, assuming that a coordinate of one of the light emitting devices is $(\sqrt{(n*a)^2-b^2}, (-1)^{n+1}n*b)$, then a coordinate of another light emitting device in central symmetry with it is $(-\sqrt{(n*a)^2-b^2}, -(-1)^{n+1}n*b)$. For example, if a coordinate of one of the light emitting devices is (n*a, 0), then a coordinate of another light emitting device in central symmetry with it is (−n*a, 0).

According to FIG. 2 and the above coordinate formula of the nth one of the light emitting devices, a rotation radius of the nth one of the light emitting devices outward from the central origin O of the plane rectangular coordinate system is n*a when the light bar 100 is in the rotary display. Thus, when the light bar 100 is rotated by taking the central origin O as an axis, the plurality of light emitting devices define a plurality of "circular display rings" with different radiuses, and the plurality of "circular display rings" are centered on the center point of the light bar 100. A distance between two adjacent ones of the "circular display rings" is "a", so that the rotary display image of the light bar 100 can present a uniform display effect, thereby effectively relieving display problems such as ghost or crosstalk.

In the embodiment, a length of each of the light emitting devices in the length direction of the light bar 100 is less than the distance "a" between the one of the light emitting devices closest to the center origin O and the center origin O, so there is no overlapping areas between two adjacent ones of the "circular display rings", thereby further relieving the display problems such as ghost or crosstalk.

Referring to FIG. 3, in the display device of the present disclosure, according to the positions of the light emitting devices on the light bar 100, coordinates of the light emitting devices in the first light emitting device group 121 are (n*a, 0) or (−n*a, 0), coordinates of the light emitting devices in the second light emitting device group 122 are $(\sqrt{(n*a)^2-b^2}, b)$, and coordinates of the light emitting devices in the third light emitting device group 123 are $(\sqrt{(n*a)^2-b^2}, -b)$.

In the embodiment, when n=0, that means only one light emitting device arranged at the center point, namely the center origin O, of light bar 100, and the coordinate of the light emitting device is (0, 0).

It should be noted that on the first axis line 101, the distance between two adjacent ones of the light emitting devices is greater than "a". This is because there are further two light emitting devices, belonging to the second light emitting device group 122 and the third light emitting device group 123 respectively, located on both sides of the first axis line 101 between the two adjacent ones of the light emitting devices in the first light emitting device group 121, so a sequence number difference of the two adjacent ones of the light emitting devices in the first light emitting device group 121 is greater than 1. To be exact, the sequence number difference of the two adjacent ones of the light emitting devices is 3, so the distance between them is 3a.

Figure 4:
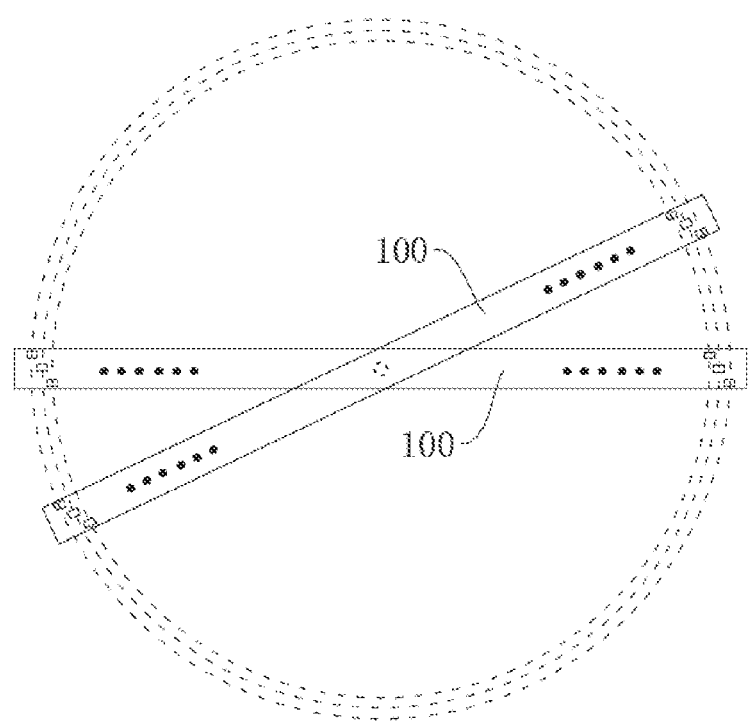
FIG. 4 is a second schematic plane structural view of a display device in the present disclosure.
Figure 5:
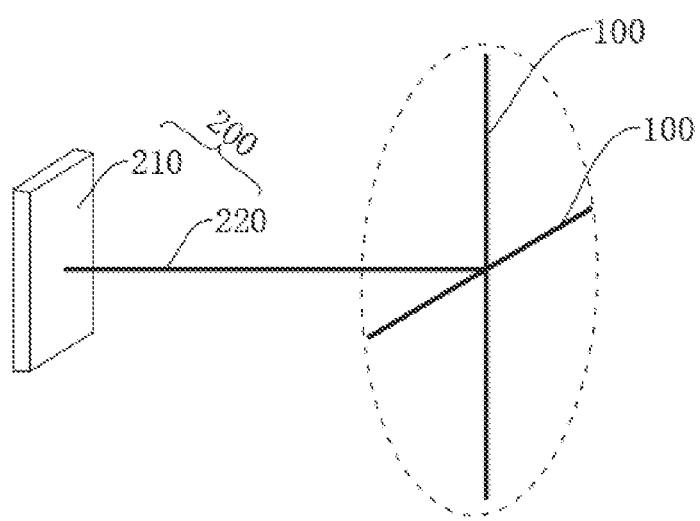
FIG. 5 is a schematic view of a second overall structure of the display device in the present disclosure.

Referring to FIG. 4 and FIG. 5, in the display device of the present disclosure, the display device includes at least two light bars 100 located on a same plane. The at least two light bars 100 are connected to the driving unit 200. In detail, arrangements of the light emitting devices on the at least two light bars 100 are the same. That is, coordinate positions of the light emitting devices are the same as the coordinate formulas of the light emitting devices in other embodiments.

In the embodiment, the at least two light bars 100 are crossed at the center points and are fixedly connected to the rotating shaft 220 of the driving unit 200, so that the at least two light bars 100 in the same plane may be driven by the driving member 210 of the driving unit 200 through the rotating shaft 220 to rotate synchronously.

In the embodiment, the at least two light bars 100 are disposed in a same plane, so that a quantity of the light bars 100 and a quantity of the light emitting devices are doubled, thereby improving a display brightness in one aspect. In another aspect, the plurality of light emitting devices on multiple light bars 100 are staggered in a rotation plane of the light bars 100, thereby further increasing a pixel density, and further improving the resolution, so that the rotary display has an ultra-high resolution or even a continuous resolution.

Figure 6:
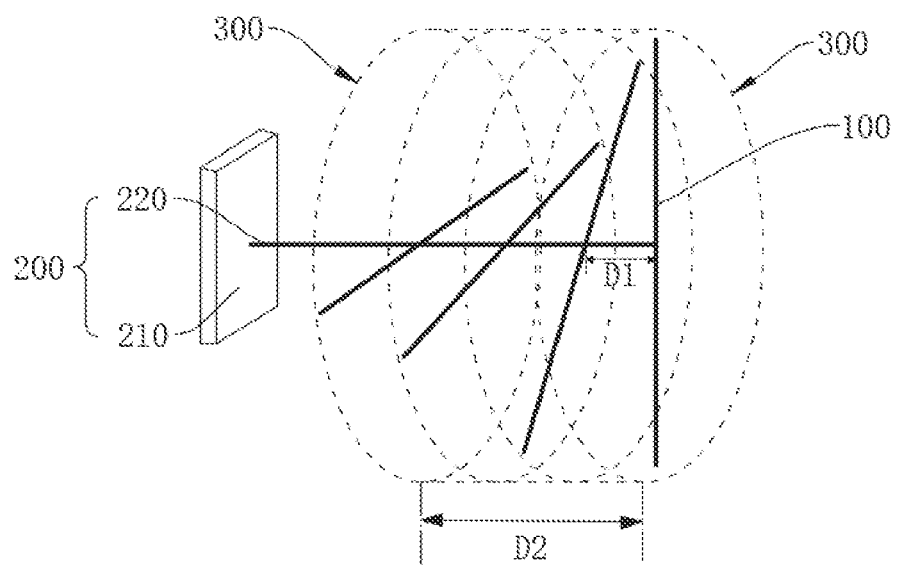
FIG. 6 is a schematic view of a third overall structure of the display device in the present disclosure.
Figure 7:
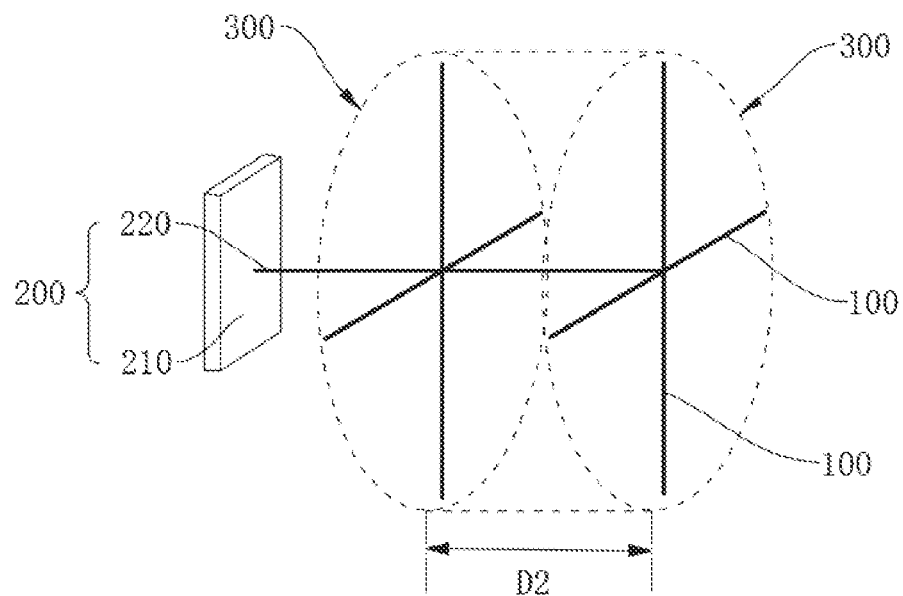
FIG. 7 is a schematic view of a fourth overall structure of the display device in the present disclosure.

Referring to FIG. 6 and FIG. 7, in the display device of the present disclosure, the display device includes at least two light bars 100 located on at least two parallel planes 300. The center points of the at least two light bars 100 on the at least two parallel planes 300 are in a same straight line and are connected to the driving unit 200. In detail, each of the parallel planes 300 may be provided with only one of the light bars 100, as shown in FIG. 6. In other embodiments, a quantity of the light bars 100 in each of the parallel planes 300 may be two or more, as shown in FIG. 7.

In the embodiment, the center points of the at least two light bars 100 on the at least two parallel planes 300 coincide with a center axis of the rotating shaft 220 of the driving unit 200, so that the at least two light bars 100 on the at least two parallel planes 300 can be driven by the rotating shaft 220 to rotate synchronously to provide a depth of the rotary display image along an axial direction of the rotating shaft 220 to achieve a three-dimensional display in space.

In the embodiment, in a top view direction of the display device, the at least two light bars 100 located on two adjacent ones of the parallel planes 300 are crossed, so that the at least two light bars 100 located on two adjacent ones of the parallel planes 300 are located in different initial positions. When the display device is in the rotary display, the at least two light bars 100 located on different initial positions may display different images, so as to realize a synchronous display of multi-directional images at different depths, and effectively improve the three-dimensional perception.

In the embodiment, in a normal direction of the parallel planes 300, that is, in the axial direction of the rotating shaft 220 of the driving unit 200, the plurality of light bars 100 may be disposed at equal intervals. A depth of an imaging space of the display device satisfies: $D2=(N-1)*D1$, where D1 is a distance between two adjacent ones of the parallel planes 300, D2 is the depth of the imaging space of the display device, and N is a number of the parallel planes 300. In other words, the depth of the imaging space of the display device is a distance between two furthest apart ones of the light bars 100 in the axial direction of the rotating shaft 220.

Figure 8:
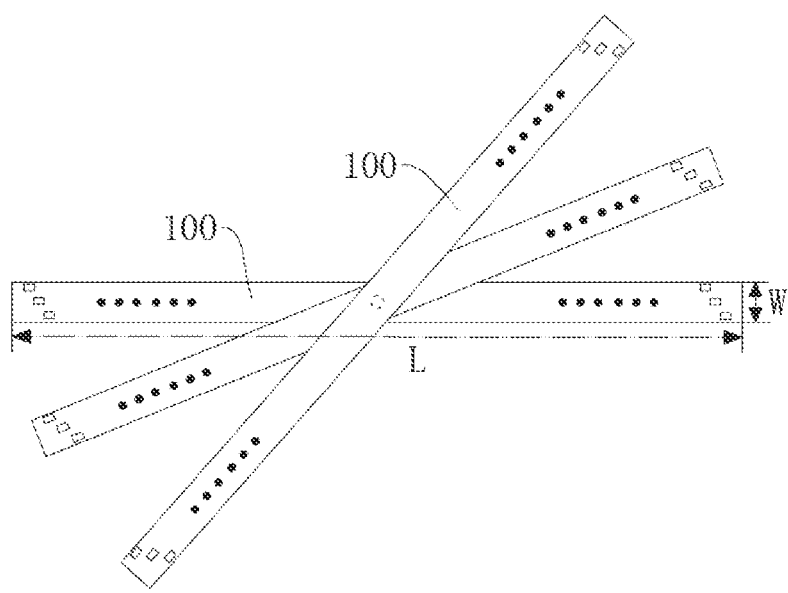
FIG. 8 is a schematic view of a planar arrangement of the light bars in the display device of the present disclosure.

Referring to FIG. 8, in the display device of the present disclosure, a quantity of the light bars 100 in the display device satisfies: $1 \le x < \pi L2/4LW$, where "x" is the quantity of the light bars 100, L is a length of each of the light bars 100, and W is a width of each of the light bars 100. In detail, in the top view direction of the display device, the display image of the display device presents a circle with a diameter L and an area size $\pi(L/2)^2$. In order to avoid pixel waste caused by overlapping of x light bars 100 in the top view of the display device, an area sum $x*L*W$ of the x light bars 100 should be less than the area $\pi(L/2)^2$ of the circular display image of the display device, that is, $x*L*W < \pi(L/2)^2$, or $x < \pi L^2/4LW$.

Through the above designs, the embodiment can effectively relieve problems such as image overlap, pixel waste, ghost, or crosstalk caused by the overlap of the light bars 100 in the top view of the display device, so as to further improve the display effect.

Figure 9:
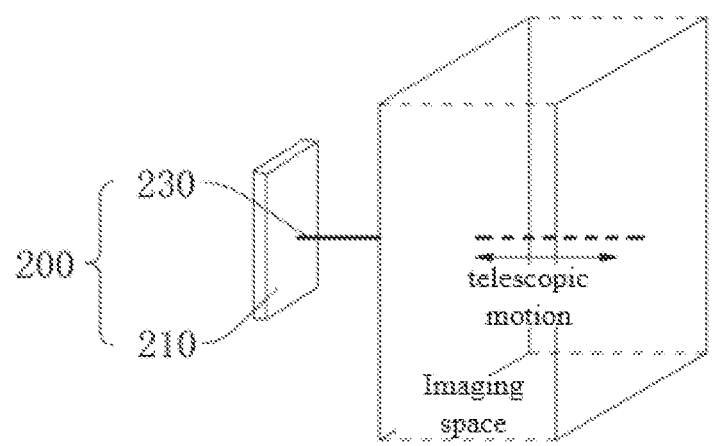
FIG. 9 is a schematic diagram showing a motion principle of a rotating telescopic shaft of the display device in the present disclosure.
Figure 10:
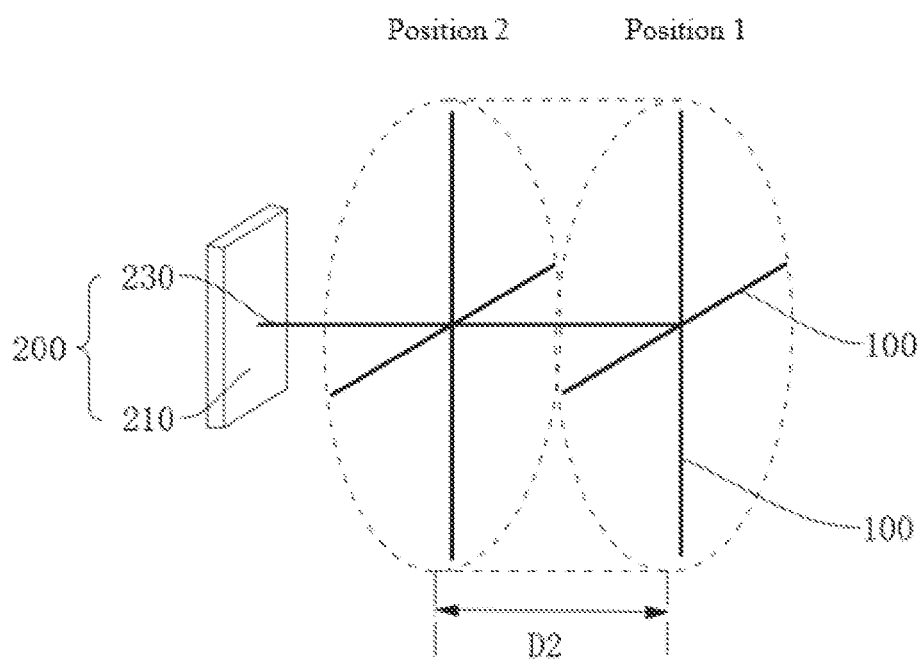
FIG. 10 is a schematic view of a fifth overall structure of the display device in the present disclosure.
Figure 11:
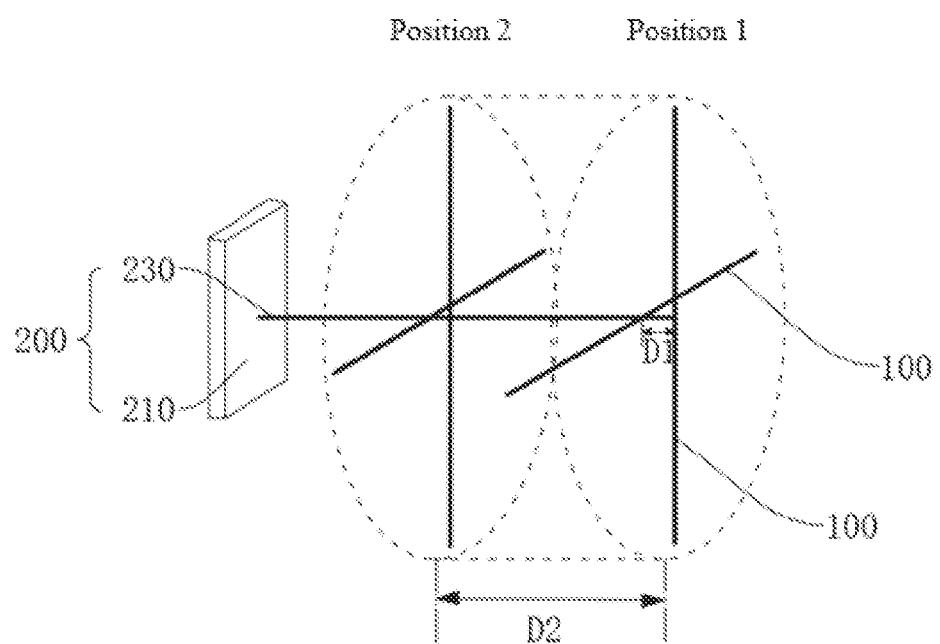
FIG. 11 is a schematic view of a sixth overall structure of the display device in the present disclosure.

Referring to FIG. 9 to FIG. 11, in the display device of the present disclosure, the rotating shaft 220 of the driving unit 200 may be a rotating telescopic shaft 230. The rotating telescopic shaft 230 rotates by driving of the driving member 210, and is telescoping in its axial direction, as shown in FIG. 9. The rotating telescopic shaft 230 is perpendicular to the light bars 100 and is fixedly connected to the center points of the light bars 100, so that the rotating telescopic shaft 230 can drive the light bars 100 to move along the axial direction of the rotating telescopic shaft 230. Thus, 3D spatial display can also be realized when there is only a single light bar 100 or at least two light bars 100 located on the same plane, as shown in FIG. 10.

In the embodiment, in an extension direction of the rotating telescopic shaft 230, the depth of the imaging space of the display device is less than or equal to a telescopic value of the rotating telescopic shaft 230. That is, a telescopic range of the rotating telescopic shaft 230 determines the depth of the imaging space of the display device.

Referring to FIG. 11, in the embodiment, when the at least two light bars of the display device are located on at least two parallel planes 300, the depth of the imaging space of the display device is not only related to the telescopic range of the telescopic shaft, but also related to a distance between the at least two parallel planes 300 along the axial direction of the rotating telescopic shaft 230 and a quantity of the parallel planes 300.

In detail, in the extension direction of the rotating telescopic shaft 230, the depth of the imaging space of the display device satisfies: $(N-1)*D1 \le D2 \le (N-1)*D1+D3$, where N is a quantity of the parallel planes 300, D1 is a distance between two adjacent ones of the parallel planes 300, D2 is the depth of the imaging space of the display device, and D3 is the telescopic value of the rotating telescopic shaft 230.

In the embodiment, when only one light bar 100 is provided on each of the parallel planes 300, the number N of the parallel planes 300 is equal to the quantity of the light bars 100, and the distance D1 between two adjacent ones of the parallel planes 300 is equal to the distance between two adjacent ones of the light bars 100.

In the embodiment, when the rotating telescopic shaft 230 is in the retracted position, a distance sum $(N-1)*D1$ of the plurality of parallel planes 300 is a minimum depth of the imaging space of the display device. When the rotating telescopic shaft 230 stretches to reach a maximum telescopic value D3, the display device has a largest depth of the imaging space, namely $(N-1)*D1+D3$.

In the embodiment, through the above designs, the rotating shaft 220 of the driving unit 200 of the display device is configured to be the rotating telescopic shaft 230, so that the depth of the imaging space of the display device can be adjusted according to the telescopic range of the rotating telescopic shaft 230, so as to achieve a better three-dimensional display effect.

In an embodiment, the display device may further include a display control module and a motion control module. The display control module is configured to convert received 2D display materials into 3D or directly parse 3D display materials according to algorithms, convert them into digital signals, and transmit them to the light bars 100 to control the light emitting devices on the light bars 100 to emit and display. At the same time, it is linked with the motion control module to make the light emitting devices on the light bar 100 response to the display materials when they move to corresponding positions, so as to realize the 3D transparent display effect.

In the embodiments of the present disclosure, the light bar 100 is provided to include the plurality of light emitting device groups 120 arranged along the width direction, each of the light emitting device groups 120 includes the plurality of light emitting devices arranged along the length direction of the light bar 100, thus a quantity of the light emitting devices on the light bar 100 is greatly improved, so as to improve the pixel number in the rotary display, and then effectively improve the resolution, to achieve an ultra-high resolution or even a continuous resolution display effect. Furthermore, in the present disclosure, the plurality of light emitting devices in any two adjacent ones of the light emitting device groups 120 are staggered in the length direction of the light bar 100. In the rotary display, the plurality of light emitting devices in the plurality of light emitting device groups 120 can complement each other in rotation planes and be uniformly distributed within the rotation radiuses of the light bar 100, so as to relieve the phenomenon of pixel vacancy or pixel coincidence, and effectively relieve the display uniformity and crosstalk problems.

It is understood that, for those of ordinary skills in the art, technical schemes and invention ideas in the present disclosure may be replaced or changed equivalently, and all such changes or substitutions shall fall within the scope of the protection of the claims attached to the present disclosure.

What is claimed is:

1. A display device, comprising:
a light bar; and
a driving unit connected to the light bar,
wherein the light bar comprises a plurality of light emitting device groups arranged along a width direction of the light bar, each of the light emitting device groups comprises a plurality of light emitting devices arranged along a length direction of the light bar, and the plurality of light emitting devices in any two adjacent ones of the light emitting device groups are staggered in the length direction of the light bar;
the light bar comprises a first axis line parallel to the length direction of the light bar, and the plurality of light emitting device groups comprise a first light emitting device group disposed on the first axis line, a second light emitting device group disposed on a side of the first light emitting device group, and a third light emitting device group disposed on a side of the first light emitting device group away from the second light emitting device group; and
in the width direction of the light bar, a distance between the first light emitting device group and the second light emitting device group is equal to a distance between the first light emitting device group and the third light emitting device group.

2. The display device according to claim 1, wherein the light bar further comprises a second axis line intersecting the first axis line vertically, and an intersection point of the first axis line and the second axis line is defined as a center origin; and
wherein on a side of the second axis line, a distance between an nth one of the light emitting devices arranged from the center origin along the length direction of the light bar and the center origin is n*a, n is zero or a positive integer, and a is a distance between one of the light emitting devices closest to the center origin and the center origin.

3. The display device according to claim 2, wherein a length of each of the light emitting devices in the length direction of the light bar is less than the distance between the one of the light emitting devices closest to the center origin and the center origin.

4. The display device according to claim 1, wherein the display device further comprises at least two light bars located on a same plane, the at least two light bars are crossed with center points coincident, and the driving unit is connected to the at least two light bars.

5. The display device according to claim 1, wherein the display device further comprises at least two light bars located on at least two parallel planes respectively, the at least two light bars on the at least two parallel planes are connected to the driving unit; and
wherein in a top view direction of the display device, at least two light bars arranged on two adjacent parallel planes respectively are crossed.

6. The display device according to claim 5, wherein in a normal direction of the at least two parallel planes, a depth of an imaging space of the display device satisfies: $D2=(N-1)*D1$, wherein D1 is a distance between the two adjacent parallel planes, D2 is the depth of the imaging space of the display device, and N is a quantity of parallel planes.

7. The display device according to claim 6, wherein a quantity of light bars satisfies: $1 \leq x < \pi L^2/4LW$, x is the quantity of the light bars, L is a length of each of the light bars, and W is a width of each of the light bars.

8. The display device according to claim 1, wherein the driving unit comprises a rotating telescopic shaft and a driving member, and the rotating telescopic shaft is configured to rotate by driving of the driving member; and
wherein a center point of the light bar is vertically connected to the rotating telescopic shaft, and the rotating telescopic shaft is retractable in a direction perpendicular to the light bar.

9. The display device according to claim 8, wherein in an extension direction of the rotating telescopic shaft, a depth of an imaging space of the display device is less than or equal to a telescopic value of the rotating telescopic shaft.

10. The display device according to claim 9, wherein the display device further comprises at least two light bars located on at least two parallel planes respectively, and center points of the at least two light bars on the at least two parallel planes are arranged in a same straight line and are rotationally connected to the driving unit; and
wherein in the extension direction of the rotating telescopic shaft, the depth of the imaging space of the display device satisfies: $(N-1)*D1 \leq D2 \leq (N-1)*D1+D3$, N is a quantity of parallel planes, D1 is a distance between two adjacent parallel planes, D2 is the depth of the imaging space of the display device, and D3 is the telescopic value of the rotating telescopic shaft.

11. A display device, comprising:
a light bar; and
a driving unit connected to the light bar,
wherein the light bar comprises a plurality of light emitting device groups arranged along a width direction of the light bar, each of the light emitting device groups comprises a plurality of light emitting devices arranged along a length direction of the light bar, the plurality of light emitting devices in any two adjacent ones of the light emitting device groups are staggered in the length direction of the light bar, and the plurality of light emitting devices of the light bar are centrosymmetric with respect to a center point of the light bar.

12. The display device according to claim 11, wherein the display device further comprises at least two light bars located on at least two parallel planes respectively, and the at least two light bars on the at least two parallel planes are connected to the driving unit; and wherein in a top view direction of the display device, at least two light bars arrange on two adjacent parallel planes respectively are crossed.

13. The display device according to claim 12, wherein in a normal direction of the at least two parallel planes, a depth of an imaging space of the display device satisfies: $D2=(N-1)*D1$, wherein D1 is a distance between the two adjacent parallel planes, D2 is the depth of the imaging space of the display device, and N is a quantity of the parallel planes.

14. The display device according to claim 13, wherein a quantity of light bars satisfies: $1 \leq x < \pi L^2/4LW$, x is the quantity of the light bars, L is a length of each of the light bars, and W is a width of each of the light bars.

15. The display device according to claim 14, wherein the driving unit comprises a rotating telescopic shaft and a driving member, and the rotating telescopic shaft is configured to rotate by driving of the driving member; and wherein the center point of the light bar is vertically connected to the rotating telescopic shaft, and the rotating telescopic shaft is retractable in a direction perpendicular to the light bar.

16. The display device according to claim 15, wherein in an extension direction of the rotating telescopic shaft, the depth of the imaging space of the display device is less than or equal to a telescopic value of the rotating telescopic shaft.

17. The display device according to claim 16, wherein the display device further comprises at least two light bars located on at least two parallel planes respectively, and center points of the at least two light bars on the at least two parallel planes are arranged in a same straight line and are rotationally connected to the driving unit; and wherein in the extension direction of the rotating telescopic shaft, the depth of the imaging space of the display device satisfies: $(N-1)*D1 \leq D2 \leq (N-1)*D1+D3$, N is a quantity of parallel planes, D1 is a distance between two adjacent parallel planes, D2 is the depth of the imaging space of the display device, and D3 is the telescopic value of the rotating telescopic shaft.

18. The display device according to claim 11, wherein the light bar comprises a first axis line parallel to the length direction of the light bar, and the plurality of light emitting device groups comprise a first light emitting device group disposed on the first axis line, a second light emitting device group disposed on a side of the first light emitting device group, and a third light emitting device group disposed on a side of the first light emitting device group away from the second light emitting device group; and wherein in the width direction of the light bar, a distance between the first light emitting device group and the second light emitting device group is equal to a distance between the first light emitting device group and the third light emitting device group.

19. The display device according to claim 18, wherein the light bar further comprises a second axis line intersecting the first axis line vertically, and an intersection point of the first axis line and the second axis line is defined as the center origin; and wherein on a side of the second axis line, a distance between an nth one of the light emitting devices arranged from the center origin along the length direction of the light bar and the center origin is $n*a$, n is zero or a positive integer, and a is a distance between one of the light emitting devices closest to the center origin and the center origin.

20. A display device, comprising:

a light bar; and a driving unit connected to the light bar, wherein the light bar comprises a plurality of light emitting device groups arranged along a width direction of the light bar, each of the light emitting device groups comprises a plurality of light emitting devices arranged along a length direction of the light bar, and the plurality of light emitting devices in any two adjacent ones of the light emitting device groups are staggered in the length direction of the light bar;

the driving unit comprises a rotating telescopic shaft and a driving member, and the rotating telescopic shaft is configured to rotate by driving of the driving member; and a center point of the light bar is vertically connected to the rotating telescopic shaft, and the rotating telescopic shaft is retractable in a direction perpendicular to the light bar.

* * * * *